W. A. ROYCE.
Machinery for Compressing Gaseous Bodies.
No. 5,201. Reissued Dec. 24, 1872.
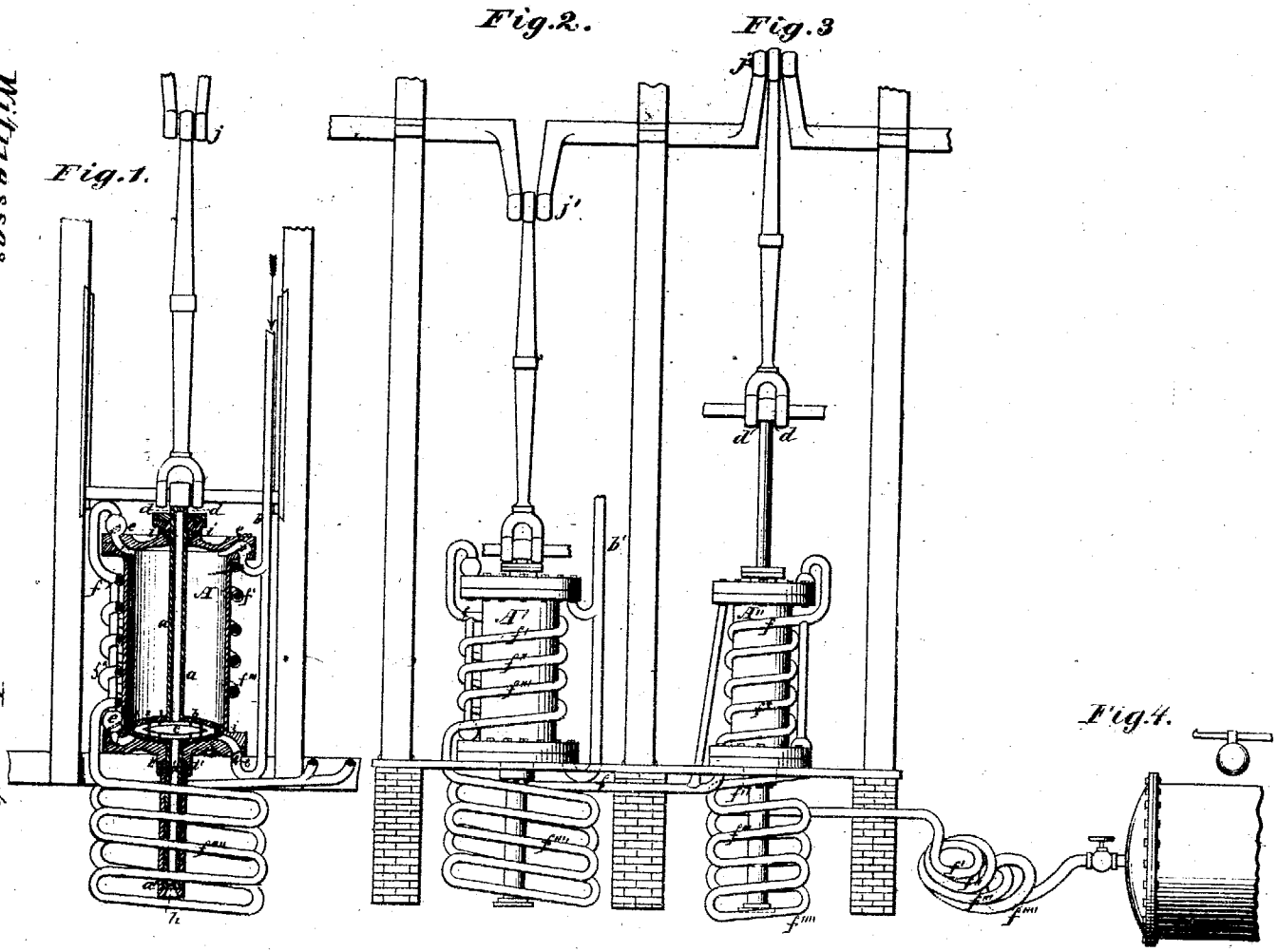
Witnesses.
Wm. K. Baldwin
E. H. Harto
Inventor.
William A. Royce

UNITED STATES PATENT OFFICE.

WILLIAM A. ROYCE, OF NEWBURG, NEW YORK.

IMPROVEMENT IN MACHINERY FOR COMPRESSING GASEOUS BODIES.

Specification forming part of Letters Patent No. 17,394, dated May 26, 1857; extended seven years; reissue No. 5,202, dated December 24, 1872.

DIVISION A.

*To all whom it may concern:*

Be it known that I, WILLIAM A. ROYCE, of the town of Newburg, in the county of Orange and State of New York, have made a new, novel, and useful Improvement in the Construction of Pneumatic Condensers, Reservoirs, and Conduits. I hereby declare the following to be a full, clear, and exact description of the same, reference being had to the accompanying drawing, which drawing is lettered to correspond with and form a part of this specification.

*Description.*

In order that the public may fully understand my invention, and those skilled in the art be enabled to construct and operate the same, I will describe it, as follows:

Figure 1 represents a vertical section of my pneumatic cylinder or condenser A. Letter *a* is a hollow piston-rod that connects with the double-convex hollow piston *b*, has a core, *c*, in its center, with sufficient space between the upper and lower head or half of the piston and the said core to allow any fluid that passes up through the lower piston-rod *a'* into the lower section of the hollow piston to pass around the core *c* up into the piston-rod *a*, from whence it is discharged through the small holes *d d* in in the upper end of the piston-rod after having performed the office of cooling the piston and rod. The piston is bolted together through the core, as shown at Figs. 1, 2, 3. Letters *e e e e* are ingress and egress valves that communicate with the refrigerating-pipe *f f' f'' f''' f''''*, through which the compressed aeriform body from either end of the cylinder is driven by the movement of the piston *b*. The great amount of heat evolved by compression of elastic fluids is more or less dissipated by the refrigerating pipe or tube. A great amount of heat, if desired, may be absorbed by the liquid surrounding the metallic cylinder A A A'' A''' and the metallic tube *f f' f'' f''' f''''*, the whole apparatus being submerged in the liquid. In the lower end of the piston-rod *a a'* there is a valve opening upward which admits the liquid to pass up into the piston-rod when it is forced down, as represented at *h*. The necessary stuffing-boxes at the upper and lower head of each cylinder are shown at *i i*. At the lower end of the metallic cylinder there is a pump-barrel connected with the stuffing-box *i' i'*, through which the piston-rod *a'* traverses, thus forming a force-pump, by means of which a current of fluid is circulated through the hollow double-convex piston and rod, for the purpose as above set forth. The metallic cylinder-heads are concavo-convex, and fitted in order to work so close in the extreme stroke of the piston as to displace almost totally the contents of the cylinder, whether liquid or aeriform.

Spray injections may be used to counteract the heat evolved by compression instead of the refrigerating-pipe and hollow piston, as above described and shown in the drawing. To effect this a number of internal perforations through the cylinder-heads to distribute the stream from a force-pump or fountain is all that is necessary.

Any ordinary power may be applied to operate the pump by means of the crank, as shown at *j j' j''* in the drawing, or otherwise.

Figs. 2 and 3 represent a pair of cylinders similar in construction to Fig. 1 and arranged upon a metallic bed-plate for operating. The cylinders A and A' are of different capacity and work simultaneously, the larger discharging into the lesser cylinder. Any number of these cylinders may be arranged and operated after the above plan, by discharging the larger into the lesser, preserving the same principle of economy in force used to attain an elastic power in conduits or reservoirs, and at the same time bearing in mind to expose the compressed matter to the refrigerating process as condensation progresses.

Fig. 4 is a reservoir for holding compressed air or other gaseous bodies, and is provided with a safety-valve, stop-cocks, tubes or pipes, and the proper valves, valve-gearing, and appendages, by which its contents can be drawn off for use. The reservoirs and tubes are coated on the inside with close-grained metals, vegetable gums, resins, oils, or extracts to prevent the escape of the gaseous bodies through the pores of the investing metal.

The object of my pneumatic apparatus is to charge or fill reservoirs or conduits with compressed aeriform bodies by means of some known mechanical power. The force-pumps A′ A″, refrigerating-pipes $f$ $f'$ $f''$ $f'''$ $f''''$, and main reservoir are stationary, as shown in the drawing, and the compressed gaseous mediums are transferred from the force pump or pumps or main pipes, or from this fixed main reservoir, by means of pipes, tubes, stop-cocks, and the proper valves and valve-gearing and appendages.

By means of my invention the compressed gaseous bodies can be used for the purposes of transmitting power and to reproduce some considerable portion of the power required for the compression, at the extremity of the conduit from the condenser or main reservoir at any desired locality, within any reasonable distance, through any of the convenient forms of steam-engine or pumps or other mechanism suitable for the purpose, and with or without the addition of heat, as may be required; or by detaching the reservoir from the condenser the power contained in the compressed air may be used for the purposes of locomotion or navigation as well as for operating machinery.

The condenser may consist of one or more cylinders and pistons or of concentric cylinders worked by any power and discharging the condensed fluid into a reservoir or through pipes for use, as aforesaid.

What I claim as my invention, and desire to secure by Letters Patent of the United States, is—

1. The method of compressing or packing gaseous mediums in a reservoir for the purpose of being used as a means of storing and transmitting power beyond the apparatus itself by means of a pump or condenser combined with the means of absorbing the heat evolved in the process of compression and with a reservoir and conduit suitable for holding and transmitting the power confined in the compressed mediums or imparted by the condensing apparatus, substantially as described.

2. The employment of a main reservoir filled with gaseous mediums compressed by means of pumps or other condensing apparatus and fitted with suitable pipes, tubes, stop-cocks, valves, valve-gearing, and appendages for the purpose of storing, retaining, distributing, and transmitting for use outside of the condensing apparatus or mechanism the power confined in the compressed mediums or imparted by the condensing apparatus, substantially as described.

3. The use of metallic reservoirs, pipes, tubes, and other accompanying mechanism coated on the inside with close-grained metals, vegetable gums, resins, oils, or extracts, when filled with compressed mediums, to prevent the escape of the gaseous bodies through the pores of the investing metal, as above described.

4. The use of the refrigerating or cooling apparatus with the cylinder in which the gaseous mediums are condensed for the purposes of power, when combined with the cylinder either externally or internally, substantially as described.

5. The use of the hollow piston with suitable valves and connections for the purpose of causing a current of cool fluid to circulate through the piston and connections, for the purpose and in the manner set forth.

6. The combination of a reservoir of compressed gaseous mediums by means of tubes or pipes of any suitable material with stop-cocks, valves, and other proper connections and appendages, through and by means of which the power confined in the compressed mediums may be drawn off for use and for the purpose of transmitting power to machinery outside of the condensing apparatus.

In testimony whereof I have hereunto subscribed my name in the presence of two witnesses.

WILLIAM A. ROYCE.

Witnesses:
WM. R. BALDWIN.
E. F. HARTE.